United States Patent
Ando

(10) Patent No.: US 11,443,485 B2
(45) Date of Patent: Sep. 13, 2022

(54) RENDERING DEVICE, RENDERING METHOD, 3D MODEL GENERATING METHOD, NEURAL NETWORK MODEL GENERATING METHOD, AND NON-TRANSITORY COMPUTER READABLE MEDIUM

(71) Applicant: Preferred Networks, Inc., Tokyo-to (JP)

(72) Inventor: Takahiro Ando, Tokyo-to (JP)

(73) Assignee: PREFERRED NETWORKS, INC., Tokyo (JP)

( * ) Notice: Subject to any disclaimer, the term of this patent is extended or adjusted under 35 U.S.C. 154(b) by 0 days.

(21) Appl. No.: 17/100,515

(22) Filed: Nov. 20, 2020

(65) Prior Publication Data
US 2021/0074059 A1    Mar. 11, 2021

Related U.S. Application Data

(63) Continuation of application No. PCT/JP2019/020624, filed on May 24, 2019.

(30) Foreign Application Priority Data

May 24, 2018    (JP) ................ JP2018-099397

(51) Int. Cl.
*G06T 15/00* (2011.01)
*G06T 17/20* (2006.01)
(Continued)

(52) U.S. Cl.
CPC ............ *G06T 17/20* (2013.01); *G06N 3/084* (2013.01); *G06T 15/80* (2013.01); *G06N 5/046* (2013.01); *G06T 15/005* (2013.01)

(58) Field of Classification Search
CPC ......... G06T 19/00; G06T 17/20; G06T 17/00; G06T 15/10; G06T 15/00
(Continued)

(56) References Cited

U.S. PATENT DOCUMENTS

| 6,577,305 B1 | 6/2003 | Duluk, Jr. et al. |
| 10,282,888 B2 | 5/2019 | Zar et al. |

(Continued)

FOREIGN PATENT DOCUMENTS

| EP | 3 048 582 A1 | 7/2016 |
| JP | 2004-309947 A | 11/2004 |

(Continued)

OTHER PUBLICATIONS

Deferred shading—Wikipedia with a machine translation, retrieved on Nov. 7, 2020, Available online, URL: https://ja.wikipedia.org/wiki/%E9%81%85%E5%BB%B6%E3%82%B7%E3%82%A7%E3%83%BC%E3%83%87%E3%82%A3%E3%83%B3%E3%82%B0.

(Continued)

*Primary Examiner* — Gordon G Liu
(74) *Attorney, Agent, or Firm* — Foley & Lardner LLP

(57) ABSTRACT

A rendering device includes at least one memory and at least one processor. The at least one processor acquires information about projection data in a 2D space from information about a region of a 3D model; stores the information about the projection data in association with the information about the region in the at least one memory; and generates the projection data based on the information about the projection data. The associated information includes information associating an identifier given to a part of regions obtained by dividing the 3D model with information about a position where the part of the regions is projected in the 2D space.

21 Claims, 3 Drawing Sheets

(51) Int. Cl.
*G06N 3/08* (2006.01)
*G06T 15/80* (2011.01)
*G06N 5/04* (2006.01)

(58) Field of Classification Search
USPC .......................................................... 345/419
See application file for complete search history.

(56) References Cited

U.S. PATENT DOCUMENTS

| | | | |
|---|---|---|---|
| 10,499,031 B2 | 12/2019 | Ayari et al. | |
| 2002/0196251 A1 | 12/2002 | Duluk et al. | |
| 2006/0028474 A1* | 2/2006 | Pfister | G06T 13/20 345/473 |
| 2007/0165035 A1 | 7/2007 | Duluk et al. | |
| 2012/0236011 A1 | 9/2012 | Diesi | |
| 2015/0145861 A1* | 5/2015 | Tytgat | G06T 17/00 345/420 |
| 2015/0262426 A1* | 9/2015 | Marner | G06F 3/011 345/419 |
| 2017/0221254 A1 | 8/2017 | Zar et al. | |
| 2018/0077400 A1 | 3/2018 | Ayari et al. | |
| 2019/0362551 A1* | 11/2019 | Sheffield | G06F 16/5854 |

FOREIGN PATENT DOCUMENTS

| | | |
|---|---|---|
| JP | 2017-142788 A | 8/2017 |
| JP | 2018-073393 A | 5/2018 |
| WO | WO-00/19377 A1 | 4/2000 |

OTHER PUBLICATIONS

Deferred shading—Wikipedia, retrieved on Nov. 7, 2020, Available online, URL: https://en.wikipedia.org/wiki/Deferred_shading.
Deferred shading—Wikipedia, Apr. 11, 2017 version with a machine translation, Available online, URL: https://web.archive.org/web/20170411182731/https://ja.wikipedia.org/wiki/%E9%81%85%E5%BB%B6%E3%82%B7%E3%82%A7%E3%83%BC%E3%83%87%E3%82%A3%E3%83%B3%E3%82%B0.
Deferred shading—Wikipedia, May 24, 2018 version, Available online, URL: https://web.archive.org/web/20180524145321/https://en.wikipedia.org/wiki/Deferred_shading.
Google tf_mesh_renderer, Mar. 23, 2018 version, Available online, URL: https://github.com/google/tf_mesh_renderer/tree/4523176d150bc193e1e804d41d57c4086da51100.
Google tf_mesh_renderer, retrieved on Nov. 7, 2020, Available online, URL: https://github.com/google/tf_mesh_renderer.
Hiroharu Kato et al., "Neural 3D Mesh Renderer", arXiv :1711.07566 v1 [cs.CV], pp. 1-17 (Nov. 20, 2017), Available online, URL: https://arxiv.org/pdf/1711.07566.pdf.
Neural 3D Mesh Renderer (CVPR 2018), retrieved on Nov. 7, 2020, Available online, URL: https://github.com/hiroharu-kato/neural_renderer.
Neural 3D Mesh Renderer, Feb. 2, 2018 version, Available online, URL: https://web.archive.org/web/20180202134331/http://hiroharu-kato.com/projects/neural_renderer.html.
Neural 3D Mesh Renderer, retrieved on Nov. 7, 2020, Available online, URL: http://hiroharu-kato.com/projects/neural_renderer.html.
Neural 3D Mesh Rendrer (CVPR 2018), Mar. 5, 2018 version, Available online, URL: https://github.com/hiroharu-kato/neural_renderer/tree/4f257d608de260afaf795bd2941f01f1bffc8564.
Neural Renderer, Mar. 5, 2018 version, Available online, URL: https://github.com/hiroharu-kato/neural_renderer/blob/4f257d608de260afaf795bd2941f01f1bffc8564/neural_renderer/rasterize.py.
Neural Renderer, retrieved on Nov. 7, 2020, Available online, URL: https://github.com/hiroharu-kato/neural_renderer/blob/master/neural_renderer/rasterize.py.
Kosuke Maeda et al., "Non-uniform line-drawings from 3DCG with CNNs," IPSJ SIG Technical Reports, Computer Graphics and Visual Informatics (CG), vol. 2018-CG-169, No. 7, pp. 1-7 (Feb. 24, 2018).

* cited by examiner

RENDERING DEVICE, RENDERING METHOD, 3D MODEL GENERATING METHOD, NEURAL NETWORK MODEL GENERATING METHOD, AND NON-TRANSITORY COMPUTER READABLE MEDIUM

CROSS REFERENCE TO RELATED APPLICATIONS

This application is continuation application of International Application No. JP2019/020624, filed on May 24, 2019, which claims priority to Japanese Patent Application No. 2018-099397, filed on May 24, 2018, the entire contents of which are incorporated herein by reference.

FIELD

This disclosure relates to a rendering device, a learning device, a rendering method, and a program.

BACKGROUND

Machine learning has been started to be applied in a wide range. A technique of learning modeling of a 3D object from a 2D image has also been suggested. However, in the case of using a general rendering engine, there is no means for propagating information from information on a rendered 2D pixel to a region being a source on a 3D model, so that backpropagation of a loss to be used for learning is not easy. Therefore, a dedicated rendering engine is required when generating a 2D image from a modeled 3D object in learning, and it is difficult to perform learning by applying a general renderer.

DETAILED DESCRIPTION

According to one embodiment, a rendering device includes at least one memory and at least one processor. The at least one processor acquires information about projection data in a 2D space from information about a region of a 3D model; stores the information about the projection data in association with the information about the region in the at least one memory; and generates the projection data based on the information about the projection data. The associated information includes information associating an identifier given to a part of regions obtained by dividing the 3D model with information about a position where the part of the regions is projected in the 2D space.

Embodiments of the present invention will now be explained with reference to the accompanying drawings. The explanations of the drawings and the embodiments are made as examples but not intended to limit the present invention.

Figure 1:
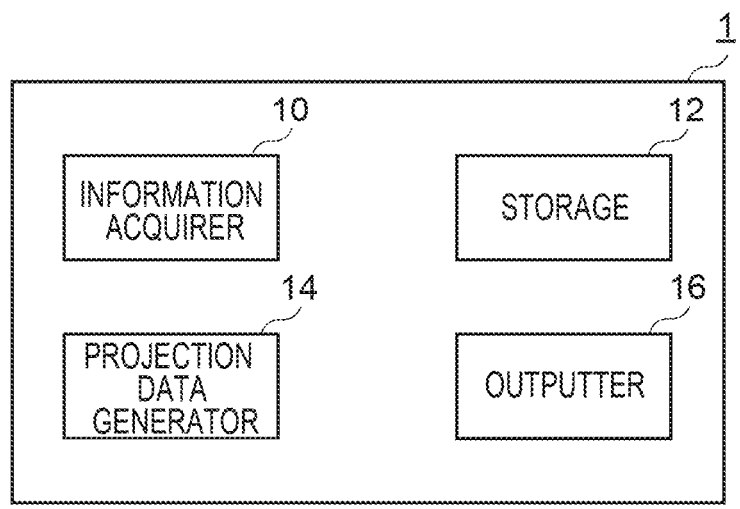
FIG. 1 is a block diagram illustrating a function of a rendering device according to an embodiment.

FIG. 1 is a diagram illustrating a rendering device 1 according to this embodiment. The rendering device 1 includes an information acquirer 10, a storage 12, a projection data generator 14, and an outputter 16, and generates from a 3D model an image obtained by projecting the 3D model to a 2D space. In the following explanation, for example, the projection data generator 14 of the rendering device 1 may include a shader or a rendering engine including a neural network.

The information acquirer 10 acquires, in the 3D model, information necessary to generate image data in a 2D space. For example, when the 3D model is given, the information acquirer 10 divides the 3D model into polygonal mesh-shaped regions (polygons), and acquires information on the 3D model in the divided polygons. This polygon is a so-called primitive, and is called a triangle when expressed by a three-sided polygon. The region will be explained as a polygon in the following explanation, but may be a curved surface indicating a part (or all) of regions of the 3D model as a wider concept including the polygon. In other words, the information acquirer 10 will be explained as the one which divides the 3D model into curved surfaces as generally performed and performs processing on the divided curved surfaces, but not always limited to this aspect. Further, in the following explanation, the information acquirer 10 performs the processing using a part of the divided 3D model, but may perform the following processing using all of the 3D model depending on the size, region, shape or the like of the 3D model.

To acquire the information, first, the information acquirer 10 executes transformation of coordinates of vertices of the polygon. As for the transformation of the coordinates, for example, local coordinates (3D) are transformed into world coordinates (3D), the world coordinates are transformed into a view coordinate system (3D), the view coordinate system is transformed into a projection coordinate system (2D), and projection coordinates are transformed into screen coordinates (2D), thereby performing transformation from the coordinate system where the 3D model exists (virtually) into a coordinate system to the 2D space where the image data is drawn. For the transformation of the coordinate systems, a generally performed transformation is used. However, the transformation does not need to pass through all of the coordinate systems as long as the local coordinates or the world coordinates can be transformed into the screen coordinates.

As explained above, by transforming the information on the vertices in each of the regions obtained by dividing the 3D model from the coordinates in the 3D space to the coordinates in the 2D space to which the information is to be projected, the 3D model can be drawn in the 2D space. The information acquirer 10 acquires information about color and reflection characteristics to be used for lighting calculation at a position (for example, a picture element) in the 2D space at a projection destination based on the information on each of the regions of the 3D model. The information to be used for lighting calculation is, for example, information including at least one of pieces of information about the projection data such as a normal vector, albedo, depth/distance, reflection, emission, diffusion, ambient occlusion, lightmap and so on. Further, the information is not limited to them but may include other information necessary for the lighting calculation for generating the projection data. The shape of each of the regions is expressed using the vertices expressed at 2D coordinates when each of the regions is transformed into the 2D coordinates, and at least one of a line segment, a curved line and a surface connecting the vertices. Further, the information about the projection data may include positional information in the 2D space.

Note that the information about the projection data (described as projection information) in the following may include the above information itself to be used for the lighting calculation or may include data which has been processed by the projection data generator 14 or the like from the information to be used for the lighting calculation and stored in the storage 12. The projection information is information stored in various forms depending on shading techniques, and may include unprocessed data to be used for the lighting calculation as explained above or may include data obtained by advancing the calculation to some extent for the above data to advance the stage of generating the projection data. For example, the projection information may be the one including the data itself to be used for lighting calculation as in the case of applying deferred shading, or may be the one including data at the middle of generating the projection data calculated from the data to be used for lighting calculation for one light source among a plurality of light sources installed in the 3D space as in the case of applying forward shading. Furthermore, the projection information is defined as including at least one piece of unprocessed or processed data of the data kinds (normal vector, albedo, and others) listed in the above example.

The storage 12 stores the information to be used for lighting calculation, such as color information at each position in the 2D space acquired by the information acquirer 10. Further, in this embodiment, the storage 12 stores, at each position, positional information in the 3D space together with the information such as the color information. The positional information in the 3D space indicates, for example, an identifier given to the above polygon or the coordinates (local coordinates or world coordinates) of the vertices of the polygon. The identifier may be the one uniquely given to the polygon. More specifically, the identifier of the polygon or the coordinates of each of the vertices of the polygon in the 3D model projected to the position are stored in a storage area indicating a certain position in the 2D space.

Associating the data as in the above manner makes it possible to grasp, based on the position of the data projected in the 2D space, the projection of the position in the 3D model, more specifically, which polygon in the 3D model the region belongs to.

The projection data generator 14 generates 2D projection data to be finally drawn using a differentiable arithmetic operation, based on the projection information stored in the storage 12. For example, the projection data generator 14 arithmetically operates reflection light from a light source existing on the 3D space based on the color information and information on the normal vector to calculate information on color, luminance and so on at each position in the 2D space, and generates the projection data.

Not limited to the above, the projection data generator 14 may generate the projection data based not on the data stored in the storage 12 but on the data acquired by the information acquirer 10. The generation of the projection data may be performed by general shading processing.

For example, in the case where the deferred shading processing being differentiable processing is selected as the shading technique, the storage 12 may be the one serving also as a so-called G buffer (Geometry Buffer) and may store the coordinate information on the vertices in the 3D space and so on in association with the color information and so on to be stored in the G buffer. In this case, the projection data generator 14 generates the projection data based on the data stored in the storage 12. However, the deferred shading is taken as an example, and other shading techniques may be used.

The outputter 16 outputs the projection data generated by the projection data generator 14. The outputter 16 may include, for example, a display, and draw the projection data on the display to thereby output it. As another example, the outputter 16 may transform the projection data to appropriate image data and output the image data to another device through a file server or network or to the storage 12 or the like.

Figure 2:
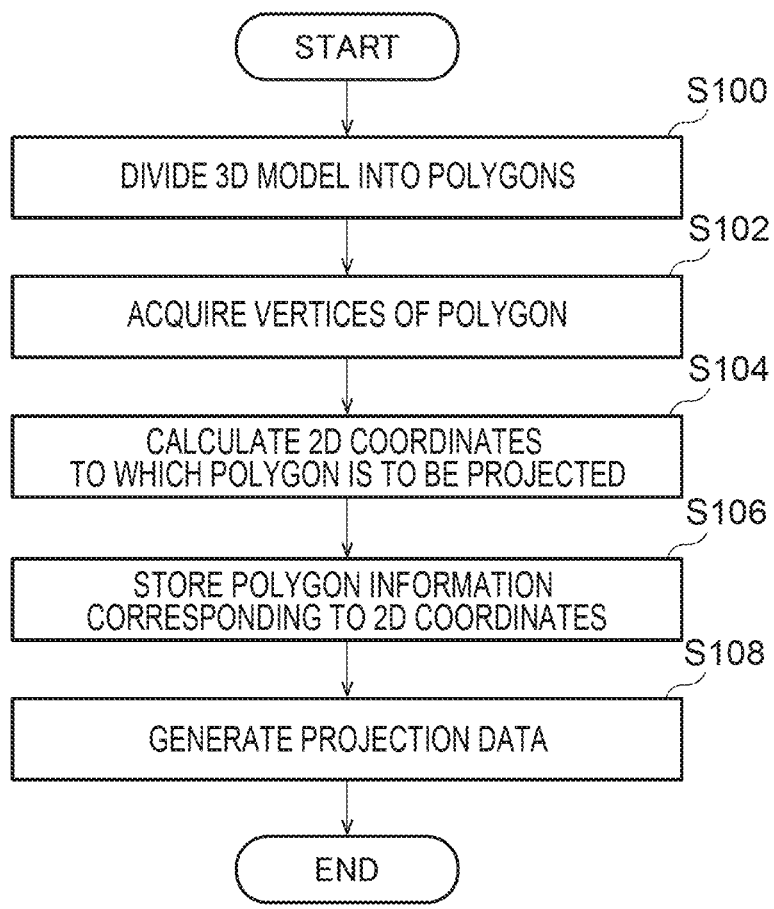
FIG. 2 is a flowchart illustrating processing by the rendering device according to an embodiment.

FIG. 2 is a flowchart illustrating an example of rendering processing by the rendering device 1 according to this embodiment. The processing by the rendering device 1 will be explained using FIG. 2.

First, the information acquirer 10 divides the 3D model into polygons (S100). Note that in the case where the 3D model itself is constituted including polygon data, this step may be omitted.

Next, the information acquirer 10 acquires the coordinates of the vertices of the polygon in the 3D space (S102). To execute the above coordinate transformation and generate the projection data to 2D, the information acquirer 10 acquires the coordinates of the vertices in the 3D space of a focused polygon.

Next, the information acquirer 10 performs the coordinate transformation on coordinate data acquired at S102 to calculate the 2D coordinates to which the polygon is to be projected (S104). The information acquirer 10 transforms the coordinates of the vertices of the polygon and connects the transformed coordinates by line segments in the 2D space to specify the coordinates in the 2D space to which the polygon is to be projected.

Next, the information acquirer 10 associates the coordinates in the 2D space to which the polygon is to be projected and the identifier of the polygon or the coordinates of the vertices in the 3D space of the polygon based on the coordinates of the polygon acquired at S104, and store them in the storage 12 (S106). As above, the information on the polygon is stored with respect to the 2D coordinates, in the storage 12.

Next, the projection data generator 14 generates the projection data based on the data acquired by the information acquirer 10 or the data stored in the storage 12 (S108).

As an example, the projection data generator 14 calculates data on a picture element to be projected in the 2D space in consideration of the installed light source based on the color information, the normal vector information and so on of the polygon data of the 3D model acquired by the information acquirer 10. The calculation of the projection data may be performed by the deferred shading or may be performed by the forward shading as explained above.

In the case of performing the deferred shading, the information necessary for drawing, such as the color information and so on, and the information for identifying the polygon are acquired by the information acquirer 10 and stored for each of the coordinates of pixels in the 2D space in which they are to be projected. The projection data generator 14 generates the projection data using the information necessary for drawing and the information on the light source and so on of the stored data.

In the case of performing the forward shading, S106 and S108 may be replaced with each other so that the projection data generator 14 calculates the projection data for each pixel based on the information acquired by the information acquirer 10 and then stores the projection data together with the information for identifying the polygon acquired by the information acquirer 10 in a memory area indicating each pixel. However, not limited to the above, the information for identifying the polygon is stored in advance in the memory area indicating the pixel, and then the projection data generator 14 generates the projection data from the color information and so on and the information on the light source and so on. When there are a plurality of light sources, data at the middle of generation may be stored together with the information for identifying the polygon or may be stored using another memory area.

After each of the polygons necessary for drawing is associated with a pixel in the 2D space and the generation of the drawing data is finished, the rendering device 1 outputs the data and so on from the outputter 16 and ends the processing. In the case where the processing of the polygons necessary for the generation of the projection data is not fished yet, the processing from S102 to S108 is performed for the polygons. In the case of the deferred shading, the processing at S108 may be performed after the processing from S102 to S106 is performed for all of the polygons.

Figure 3:
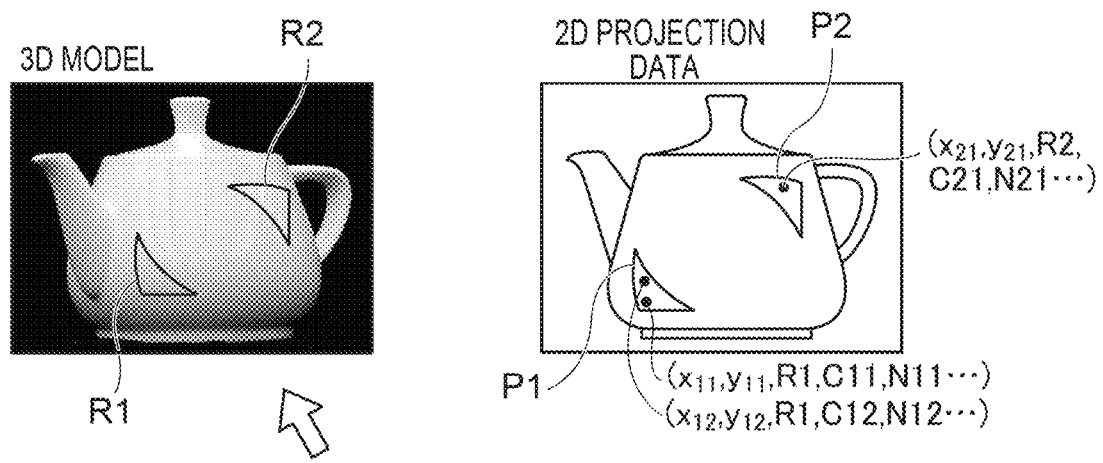
FIG. 3 is a view illustrating correspondence between a 3D model and 2D projection data according to an embodiment.

FIG. 3 is a view illustrating a storage method of a memory when generating the projection data from the 3D model in the case of performing the deferred shading as an example. This processing is constituted by a differentiable arithmetic operation. The left view illustrates the 3D model and the right view illustrates the projected image. It is assumed that a region R1 of the 3D model is projected to a projection P1 in the 2D space. Similarly, it is assumed that a region R2 is projected to a projection P2. It is assumed that the projection viewed from a direction of an arrow in the left view is the right view.

Here, data stored for a picture element (pixel) at coordinates $(x_{11}, y_{11})$ in the projection P1 and data stored for a picture element (pixel) at coordinates $(x_{12}, y_{12})$ in the projection P1 will be explained. The color information and the normal vector information on each picture element will be explained as representative examples, but parameters to be stored, the arrangement order of the parameters and so on are not limited to the example.

The color information and the normal vector information on a region corresponding to the pixel in the region R1 regarded as C11, N11 respectively are stored in association with the coordinates $(x_{11}, y_{11})$ in the storage 12, for example, as $(x_{11}, y_{11}, R1, C11, N11, \ldots)$ as illustrated in the drawing. R1 is identification information for the region R1 and is, for example, the identifier of the polygon or the coordinates of the vertices as explained above. Not only the color information and the normal vector information but other information may be similarly stored.

The color information and the normal vector information on a region corresponding to the pixel in the region R1 are similarly stored in association with the coordinates $(x_{12}, y_{12})$ in the storage 12 as $(x_{12}, y_{12}, R1, C12, N12, \ldots)$. However, in the case of considering the picture elements as having the same color information and normal information on the same polygon, C12=C11, N12=N11. As explained above, the color information and the normal vector information are stored with attached information capable of tracing back which region on the 3D model the picture element belongs to, from the information on the coordinates in the 2D space.

The storage method is not limited to the illustrated method. For example, regions in which the color information, the normal vector information, and the polygon information can be collectively stored are prepared in advance respectively, and may be arranged to correspond to the coordinates in the 2D memory space to store them In this case, a color information tensor, a normal vector information tensor, a polygon information tensor and so on will be secured in separate regions.

As another example, a region in which the color information, the normal vector information, and the polygon information can be collectively stored may be prepared for the coordinates. In this case, data such as (R1, C12, N12, . . . ) is stored for the memory area at the coordinates $(x_{11}, y_{11})$. Not limited to the above, data may be stored by other various methods of using the memory area.

Also for the region R2, data is similarly stored for each pixel in the projection P2. For example, data such as $(x_{21}, y_{21}, R2, C21, N21, \ldots)$ is stored for coordinates $(x_{21}, y_{21})$.

Note that in the case where the same color information, the same normal vector information and so on are given in the polygon as explained above, the coordinates at the vertices of the projection P1 or the like, the information on R1, and the information necessary for drawing, such as the color information, may be stored in association. In the projection data, which region of the 3D model the coordinates in the 2D space are projected from can be calculated back based on the coordinates of the projected vertices of the region of the 3D model.

In the case of the deferred shading, the projection data generator 14 generates the projection data from the conditions such as the light source, a visual point and so on using the information necessary for drawing, such as the color information and so on.

Similarly, in the case of the forward shading, the information about the region of the 3D model (hereinafter, described as region information) can be stored. For example, the forward shading can be implemented by storing the region information on the 3D model together with the color information of the projection data at each stage of each shading. In this case, there is no need to write the region information again with respect to a pixel to which the region information has been written once, and therefore it is also possible not to write the region information for the writing at second and subsequent times.

As explained above, according to this embodiment, storing each picture element (pixel) of the projected data and a polygon corresponding thereto of the 3D model in association makes it possible to trace back which polygon of the 3D model the picture element of the projected data has been projected from by differentiable arithmetic processing.

Hereinafter, a learning device for the rendering device 1 using the rendering device 1 according to the above-explained embodiment will be explained. In the following explanation, for example, the projection data generator 14 of the rendering device 1 includes a shader or a rendering engine including a neural network.

Figure 4:
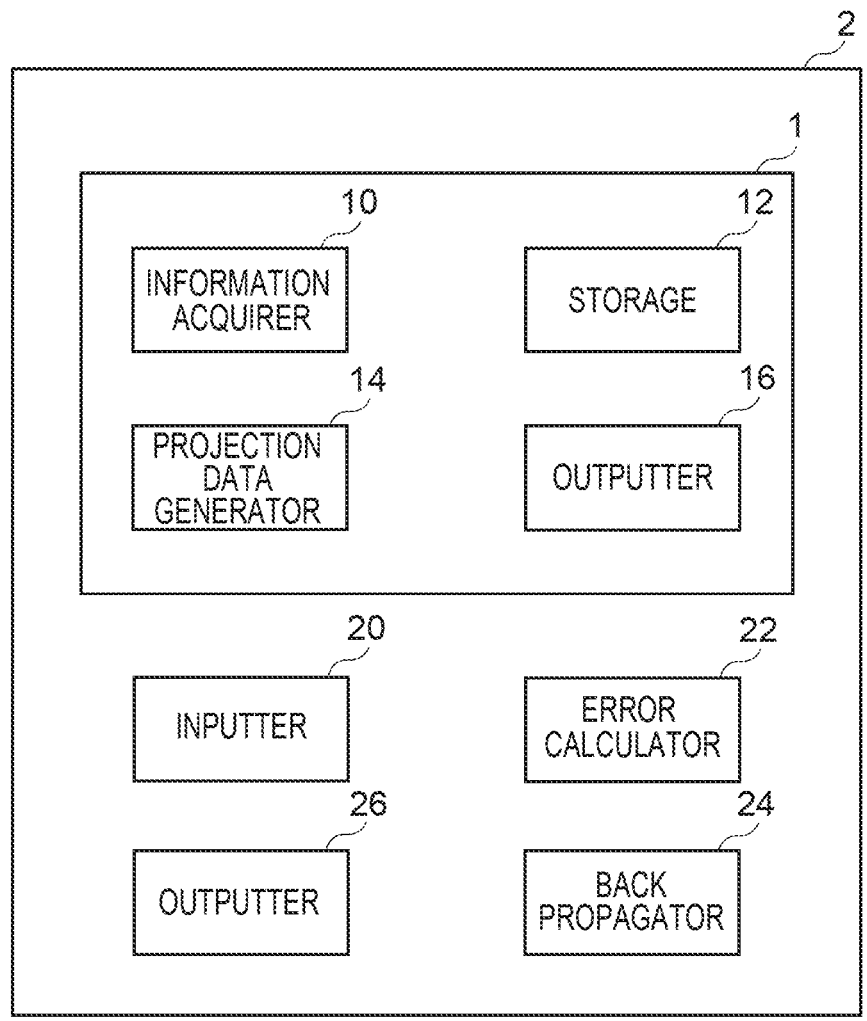
FIG. 4 is a block diagram illustrating a function of a learning device 2 according to an embodiment.

FIG. 4 is a block diagram illustrating a learning device 2 for the rendering device 1. The learning device 2 includes the rendering device 1, an inputter 20, an error calculator 22, a backpropagator 24, and an outputter 26. Besides, as another example, the learning device 2 may be another constitution independent from the rendering device 1.

The inputter 20 accepts input of the 3D model. As another example, the inputter 20 may further accept input of supervised data of 2D projection.

The error calculator 22 calculated an error (loss) from the projection data generated by the rendering device 1 based on the 3D model input from the inputter 20. For example, there is 2D projected supervised data, the error calculator 22 calculates the error to be used for updating the neural network from the information on each color space at each pixel of the supervised data and the projection data.

The error to be calculated is not limited to the above, but may be an error between the information on the shape, namely, coordinates of a portion of the projection data and coordinates in ideal projection data calculated from the coordinates of the region of the 3D model corresponding to the projection data, or may be an error based on what texture of the projection data the texture given to the 3D model has been transformed to in the transformation by the rendering device 1 and in the ideal data.

The backpropagator 24 propagates the error calculated by the error calculator 22 back to a layer before the neural network. For example, the error calculated in an output layer is propagated back to the hidden layer previous to the output layer. After a weighting matrix of the layer is updated using the error propagated to the layer, an error is calculated by the error calculator 22, and the calculated error is propagated back to the further previous layer. As in the above, the backpropagation is repeated until an input layer or the layer previous to the input layer, whereby the weighting matrix, namely, the parameters of the neural network are updated.

The number of epochs, the number of batches and so on relating to the updating of the neural network may be arbitrarily decided. This updating can be performed by a general updating method.

The above backpropagation can be performed by determining which polygon in the 3D model the coordinates of the projection data correspond to, so that the backpropagation can be performed using the data on the identifier of the polygon stored in the storage 12 of the rendering device 1. This is because the information on from which polygon of the 3D model the rendering result has been transformed to the data on the picture element of the focused projection data, is required at timing of performing forward propagation.

The outputter 26 outputs the neural network updated by the backpropagator 24. In the above case, the outputter 26 may output, for example, the shader or the rendering engine.

Note that the output is the neural network in the above, but is not limited to this. For example, the output may be a general shader or rendering engine which outputs the projection data upon input of the 3D model and can accept correction of the parameters used in shading or rendering.

In this case, the error calculator 22 compares the color information on the pixel for which the projection data exists and the ideal color information to calculate an error between them. Next, the backpropagator 24 feeds the error back to the shader or the rendering engine, and optimizes the shader or the rendering engine by a genera optimization technique without using the neural network. As in the above, the range to which this embodiment is applicable is not limited to the neural network.

In a further application, use of the rendering device 1 and the learning device 2 as in the above makes it possible to form a 3D model of outputting ideal 2D projection data which the index best meets as defined by an error function or target 2D projection data. This case can be realized not by performing feedback to the shader or the rendering engine but by performing feedback to the 3D model.

According to the above-explained embodiment, differentiable rendering with an identifier in each region attached thereto can be implemented. The implementation enables backpropagation of the error in the rendering processing. This makes it possible to apply a machine learning technique including deep learning based on a 3D reconstitution model and the rendering result and to appropriately train the neural network.

The solution in the technique of rasterization is illustrated in the above but, not limited to this, a part of all of the solution is applicable also to ray tracing. Applying the solution to the ray tracing technique makes it possible to handle the reflection characteristics and so on in a form close to that in the real world in more detail and to incorporate them into the neural network. Further, the solution can be applied also to the training to an object on a more abstract layer by further backpropagation from a 3D object.

Furthermore, the explained has been made based only on one mesh in the above but it is, of course, possible to cope with a plurality of meshes. Using the plurality of meshes in this manner makes it possible to perform rendering to a plurality of objects in parallel and training of a machine learning model. In this case, not only the identifier of the region but also an identifier of an object (for example, a group identifier indicating a group) may be set. In other words, identifiers indicating which region belongs to which object may be separately provided as identifiers. Further, a table may be separately prepared, and which object the identifier of each region belongs to is stored therein, so that the table may be referred to at timing of performing the backpropagation processing.

According to the learned model trained as above, it also becomes possible to perform shading from a 2D image (for example, an RGB image, a gray scale image or the like) acquired in real time or a 3D image (for example, an RGB-D image, an image with a depth map or the like). Providing the learned model, for example, in a robot, an automatic operation device or the like makes it possible to perform high-speed shading processing and perform high-speed and safe automatic operation or the like based on the shading result.

Besides, the shading and rendering with visible light have been explained in the above, but not limited to the above. For example, similar processing can be performed also for other information such as radio wave, sound or the like other than the visible light.

The storage 12 which stores the data necessary for the backpropagation may be implemented by a texture. In other words, the information on color or the like is stored and each of the above-explained identifiers may be stored in the texture. In the case of performing shading, and in the case of performing training of the neural network, each piece of data stored in the texture can be referred to.

In the rendering device 1 and the learning device 2 according to some embodiments, each function may be implemented by a circuit constituted by an analog circuit, a digital circuit, or an analog/digital mixed circuit. A control circuit which controls each function may be included in the optimization apparatus 1. Each circuit may be implemented as an ASIC (application specific integrated circuit), an FPGA (field programmable gate array), or the like.

In all of the foregoing explanations, at least a part of the rendering device 1 and the learning device 2 may be constituted by hardware, or by software and a Central Processing Unit (CPU) or the like may implement the function through information processing of the software. When it is constituted by software, programs that enable the rendering device 1, the learning device 2 and at least a part of the functions may be stored in storage media, such as a flexible disk and a CD-ROM, and may be executed by being read by a computer. The storage media are not limited to detachable media such as a magnetic disk or an optical disk, and may include fixed storage media such as a hard disk device and a memory. That is, the information processing may be concretely implemented using hardware resources. For example, the processing may be implemented on a circuit such as the FPGA, and may be executed by hardware. The generation of the models and the subsequent processing of the model input may be performed by using, for example, an accelerator such as a Graphics Processing Unit (GPU).

For example, a computer may be programmed to act according to the above embodiments by dedicated software stored in a computer-readable storage medium. The kinds of storage media are not limited. The computer may be used to implement a device according to the embodiment by installing dedicated software on the computer, e.g., by downloading the software through a communication network. The information processing is thereby concretely implemented using hardware resources.

Figure 5:
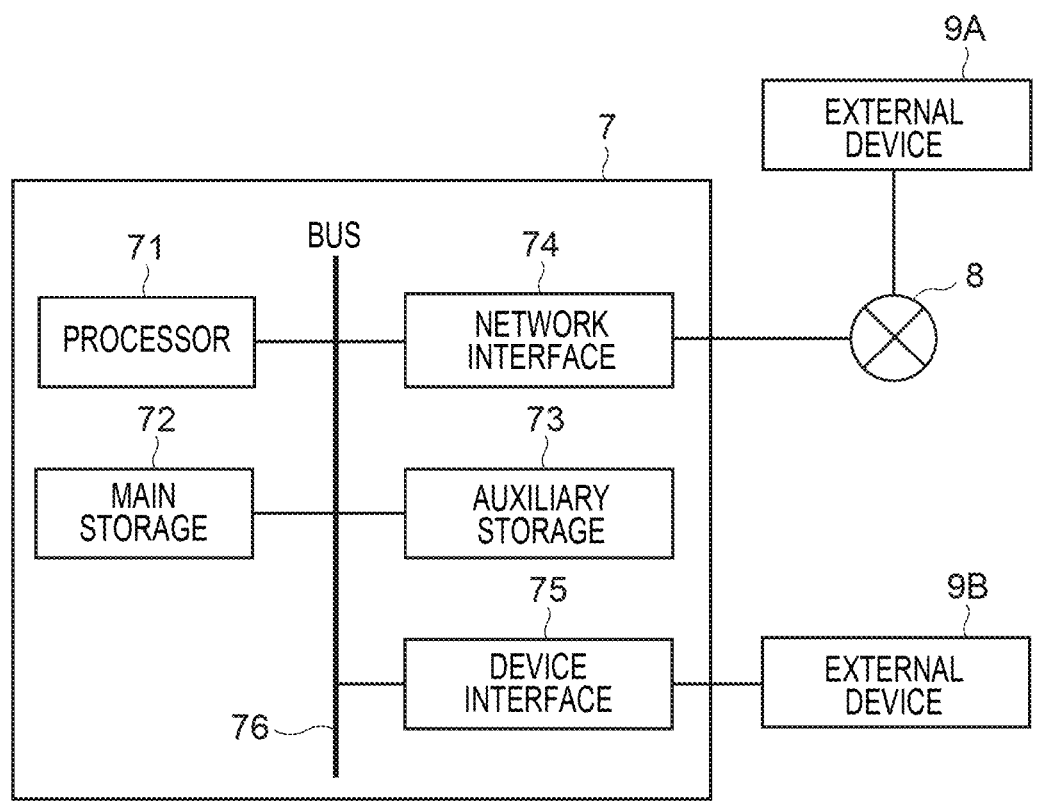
FIG. 5 is a block diagram illustrating an example of hardware implementation according to an embodiment.

FIG. 5 is a block diagram illustrating an example of a hardware configuration according to some embodiments of the present disclosure. The rendering device 1 and the learning device 2 may include a computing device 7 having a processor 71, a main storage 72, an auxiliary storage 73, a network interface 74, and a device interface 75, connected through a bus 76.

Although the computing device 7 shown in FIG. 5 includes one of each component 71-76, a plurality of the same components may be included. Moreover, although one computing device 7 is illustrated in FIG. 5, the software may be installed into a plurality of computing devices, and each of the plurality of computing devices may execute a different part of the software process.

The processor 71 may be an electronic circuit (processing circuit) including a control device and an arithmetic logic unit of the computer. The processor 71 may perform arithmetic processing based on data and programs input from each device or the like of an internal configuration of the computing device 7, and output arithmetic operation results and control signals to each device or the like. For example, the processor 71 may control each component constituting the computing device 7 by executing an OS (operating system), applications, and so on, of the computing device 7. The processor 71 is not limited to a particular processor and may be implemented by any processor capable of performing the above-stated processing.

The main storage 72 may store instructions executed by the processor 71, various data, and so on, and information stored in the main storage 72 may be directly read by the processor 71. The auxiliary storage 73 may be a storage other than the main storage 72. These storages may be implemented using arbitrary electronic components capable of storing electronic information, and each may be a memory or a storage. Both a volatile memory and a non-volatile memory can be used as the memory. The memory storing various data in the rendering device 1 and the learning device 2 may be formed by the main storage 72 or the auxiliary storage 73. For example, at least one of the storages 12 for the rendering device 1 and the learning device 2 may be implemented in the main storage 72 or the auxiliary storage 73. As another example, at least a part of the storage 12 may be implemented by a memory which is provided at the accelerator, when an accelerator is used.

The network interface 74 may be an interface to connect to a communication network 8 through a wire or wireless interface. An interface which is compatible with an existing communication protocol may be used as the network interface 74. The network interface 74 may exchange information with an external device 9A which is in communication with computing device 7 through the communication network 8.

The external device 9A may include, for example, a camera, a motion capture device, an output destination device, an external sensor, an input source device, and so on. The external device 9A may be a device implementing a part of the functionality of the components of the rendering device 1 and the learning device 2. The computing device 7 may transmit or receive a part of processing results of the rendering device 1 and the learning device 2 through the communication network 8, like a cloud service.

The device interface 75 may be an interface such as a USB (universal serial bus) which directly connects with an external device 9B. The external device 9B may be an external storage medium or a storage device. At least part of the storage may be formed by the external device 9B.

The external device 9B may include an output device. The output device may be, for example, a display device to display images, and/or an audio output device to output sounds, or the like. For example, there external device may include an LCD, (liquid crystal display), a CRT (cathode ray tube), a PDP (plasma display panel), a speaker, and so on. However, the output device is not limited to these examples.

The external device 9B may include an input device. The input device may include devices such as a keyboard, a mouse, a touch panel, or the like, and may supply information input through these devices to the computing device 7. Signals from the input device may be output to the processor 71.

Various arithmetic operations of learning and inference may be executed by parallel processing using an accelerator such as GPU or using a plurality of computers over the network. For example, the batch processing in the learning and the processing of generating the operation information on each object in the inference may be executed at the same timing with the arithmetic operations distributed to a plurality of arithmetic cores.

The invention claimed is:

1. A projection data generating device for generating projection data in a 2D space, comprising:
    at least one memory; and
    at least one processor configured to:
        acquire information about the projection data in the 2D space from information about a 3D model;
        store, in the at least one memory, (i) the information about the projection data in the 2D space and (ii) information associating identification information given to a part of the 3D model with a pixel where the part of the 3D model is projected in the 2D space; and
        generate the projection data in the 2D space based on the information about the projection data in the 2D space.

2. The projection data generating device according to claim 1, wherein
    the at least one processor is configured to generate the projection data using deferred shading.

3. The projection data generating device according to claim 2, wherein
    the at least one memory is a G buffer (Geometry buffer).

4. The projection data generating device according to claim 1, wherein
    the at least one processor is configured to generate the projection data by a differentiable arithmetic operation.

5. The projection data generating device according to claim 1, wherein
    the at least one processor is configured to generate the projection data by a neural network.

6. The projection data generating device according to claim 5, wherein
the at least one processor is configured to update the neural network using information indicating an error between supervised data and the projection data.

7. The projection data generating device according to claim 1, wherein
the part of the 3D model has a shape of a polygon.

8. The projection data generating device according to claim 1, wherein
the information about the projection data includes information about at least one of color, normal vector, albedo, depth, distance, reflection, emission, diffusion, ambient occlusion, lightmap, or data to be used for lighting calculation.

9. The projection data generating device according to claim 1, wherein
the at least one processor is configured to perform a backpropagation by propagating information indicating an error between supervised data and the projection data back to the 3D model using the associating information.

10. The projection data generating device according to claim 9, wherein
the at least one processor is configured to update the 3D model based on the backpropagation.

11. The projection data generating device according to claim 1, wherein
the at least one processor is configured to generate the projection data using at least one of a shading or a rendering.

12. The projection data generating device according to claim 11, wherein
the at least one processor is configured to update parameters for the at least one of the shading or the rendering by using an error between supervised data and the projection data.

13. The projection data generating device according to claim 11, wherein
the at least one processor is configured to generate the projection data by using a forward shading.

14. The projection data generating device according to claim 1, wherein
the information about the 3D model is at least one of identifier data, or coordinate data of the part of the 3D model.

15. The projection data generating device according to claim 1, wherein
the at least one processor is further configured to store, in the at least one memory, information associating identification information given to another part of the 3D model with another pixel where the another part of the 3D model is projected in the 2D space.

16. A method for generating projection data in a 2D space comprising:
acquiring, by at least one processor, information about the projection data in the 2D space from information about a 3D model;
storing, by the at least one processor in at least one memory, (i) the information about the projection data in the 2D space and (ii) information associating identification information given to a part of the 3D model with a pixel where the part of the 3D model is projected in the 2D space; and
generating, by the at least one processor, the projection data in the 2D space based on the information about the projection data in the 2D space.

17. The method according to claim 16, further comprising:
performing, by the at least one processor, a backpropagation by propagating information indicating an error between supervised data and the projection data back to the 3D model using the associating information.

18. The method according to claim 17, further comprising:
updating, by the at least one processor, the 3D model based on the backpropagation.

19. A non-transitory computer readable medium storing therein a program which, when executed by at least one processor performs a method comprising:
acquiring, by at least one processor, information about projection data in a 2D space from information about a 3D model;
storing, by the at least one processor in at least one memory, (i) the information about the projection data in the 2D space and (ii) information associating identification information given to a part of the 3D model with a pixel where the part of the 3D model is projected in the 2D space; and
generating, by the at least one processor, the projection data in the 2D space based on the information about the projection data in the 2D space.

20. The non-transitory computer readable medium according to claim 19, wherein the method further comprises:
performing, by the at least one processor, a backpropagation by propagating information indicating an error between supervised data and the projection data back to the 3D model using the associating information.

21. The non-transitory computer readable medium according to claim 20, wherein the method further comprises:
updating, by the at least one processor, the 3D model based on the backpropagation.

* * * * *